(12) United States Patent
Schueller et al.

(10) Patent No.: US 10,679,198 B2
(45) Date of Patent: Jun. 9, 2020

(54) SYSTEM AND METHOD FOR HANDLING AN OFFER TO PURCHASE A FOLLOWED ITEM

(75) Inventors: Dana L. Schueller, Chicago, IL (US); Marisa Lynne Brillhart, Chicago, IL (US); Dan S. Grimm, Chicago, IL (US); John Johnson, Charlotte, NC (US); Shubham Agarwal, Schaumburg, IL (US); Theodore Alexander Rudman, Winfield, IL (US)

(73) Assignee: TRANSFORM SR BRANDS LLC, Hoffman Estates, IL (US)

(*) Notice: Subject to any disclaimer, the term of this patent is extended or adjusted under 35 U.S.C. 154(b) by 0 days.

(21) Appl. No.: 13/086,949

(22) Filed: Apr. 14, 2011

(65) Prior Publication Data
US 2011/0196732 A1    Aug. 11, 2011

Related U.S. Application Data

(63) Continuation-in-part of application No. 12/850,722, filed on Aug. 5, 2010, now Pat. No. 8,789,750, which
(Continued)

(51) Int. Cl.
*G06Q 30/00* (2012.01)
*G06Q 20/20* (2012.01)
(Continued)

(52) U.S. Cl.
CPC ............ *G06Q 20/20* (2013.01); *G06Q 20/32* (2013.01); *G06Q 20/3255* (2013.01);
(Continued)

(58) Field of Classification Search
CPC ...................................................... G06Q 30/00
See application file for complete search history.

(56) References Cited

U.S. PATENT DOCUMENTS

| 5,640,193 A | 6/1997 | Wellner |
| 5,978,773 A | 11/1999 | Hudetz et al. |

(Continued)

FOREIGN PATENT DOCUMENTS

| JP | 2002-170028 A | 6/2002 |
| WO | 2001/097105 | 12/2001 |

(Continued)

OTHER PUBLICATIONS

Moran et al., Auto-ID Use Case: Improving Differential Item Pricing in a Retail Company—Impact on Existing Procedures and Information Systems, Oct. 1, 2004, Institute for Manufacturing, pp. 1-36. (Year: 2004).*
(Continued)

*Primary Examiner* — William A Brandenburg
*Assistant Examiner* — Christopher C Busch
(74) *Attorney, Agent, or Firm* — McAndrews, Held & Malloy, Ltd.

(57) ABSTRACT

A system receives from a customer having an associated rewards points account a price offer for an item. The system determines if the price offer for the item is below an established threshold price, e.g., a price a retailer would accept for the item. When the price offer for the item is below the established threshold price, the system determines an amount of rewards points to be redeemed by the customer to thereby allow the customer to purchase the item at the price offer for the item as received from the customer. The system then allows the item to be purchased by the customer at the price offer for the item as received from the customer in the event that the customer indicates a willingness to redeem the determined amount of rewards points from their associated rewards points account.

20 Claims, 6 Drawing Sheets

Related U.S. Application Data is a continuation-in-part of application No. 12/038,315, filed on Feb. 27, 2008, now Pat. No. 7,963,441.

(60) Provisional application No. 60/920,063, filed on Mar. 26, 2007.

(51) Int. Cl.
*G06Q 20/32* (2012.01)
*G06Q 30/02* (2012.01)
*G06Q 20/38* (2012.01)
*G06Q 30/06* (2012.01)

(52) U.S. Cl.
CPC ....... *G06Q 20/3276* (2013.01); *G06Q 20/387* (2013.01); *G06Q 30/02* (2013.01); *G06Q 30/0233* (2013.01); *G06Q 30/06* (2013.01)

(56) References Cited

U.S. PATENT DOCUMENTS

| | | | |
|---|---|---|---|
| 5,979,757 A | 11/1999 | Tracy et al. | |
| 6,049,835 A | 4/2000 | Gagnon | |
| 6,141,666 A | 10/2000 | Tobin | |
| 6,199,048 B1 | 3/2001 | Hudetz et al. | |
| 6,304,855 B1 | 10/2001 | Burke | |
| 6,616,049 B1 | 9/2003 | Barkan | |
| 6,636,837 B1 | 10/2003 | Nardozzi | |
| 6,769,018 B2 | 7/2004 | Gagnon | |
| 6,813,608 B1 | 11/2004 | Baranowski | |
| 6,912,507 B1 | 6/2005 | Phillips | |
| 6,954,735 B1 | 10/2005 | Djupsjobacka | |
| 6,993,573 B2 | 1/2006 | Hunter | |
| 7,024,378 B2 | 4/2006 | Razumov | |
| 7,054,832 B1 | 5/2006 | Vallabh | |
| 7,156,311 B2 * | 1/2007 | Attia et al. | 235/462.46 |
| 7,231,380 B1 | 6/2007 | Pienkos | |
| 7,249,050 B1 * | 7/2007 | Walker et al. | 705/14.13 |
| 7,363,253 B2 | 4/2008 | Forbis | |
| 7,634,295 B2 | 12/2009 | Hayaashi et al. | |
| 7,657,463 B1 | 2/2010 | Shaw et al. | |
| 7,698,172 B2 | 4/2010 | Choe | |
| 7,963,441 B2 | 6/2011 | Emmons et al. | |
| 8,590,786 B2 | 11/2013 | Schueller et al. | |
| 8,789,750 B2 | 7/2014 | Schueller et al. | |
| 2002/0111873 A1 * | 8/2002 | Ehrlich | G06Q 20/201 705/80 |
| 2005/0097003 A1 | 5/2005 | Linker | |
| 2005/0125301 A1 | 6/2005 | Muni | |
| 2005/0160004 A1 * | 7/2005 | Moss et al. | 705/14 |
| 2005/0267809 A1 | 12/2005 | Zheng | |
| 2006/0053056 A1 * | 3/2006 | Alspach-Goss | G06Q 20/10 705/14.17 |
| 2007/0162350 A1 | 7/2007 | Friedman | |
| 2008/0073429 A1 | 3/2008 | Oesterling | |
| 2008/0082424 A1 | 4/2008 | Walton | |
| 2008/0103784 A1 * | 5/2008 | Wong et al. | 705/1 |
| 2008/0288486 A1 * | 11/2008 | Kim | G06F 17/30905 |
| 2009/0108057 A1 * | 4/2009 | Mu | H04M 1/72561 235/375 |
| 2009/0216549 A1 * | 8/2009 | Causey | G06Q 30/02 705/26.1 |
| 2010/0076794 A1 * | 3/2010 | Seippel | G06Q 10/08 705/4 |
| 2010/0241525 A1 | 9/2010 | Aguera y Arcas | |
| 2010/0291907 A1 * | 11/2010 | MacNaughtan et al. | 455/414.1 |
| 2013/0041761 A1 * | 2/2013 | Voda | 705/14.68 |

FOREIGN PATENT DOCUMENTS

| | | |
|---|---|---|
| WO | 2002/033518 | 4/2002 |
| WO | 2006/126996 | 11/2006 |
| WO | 2010/021599 A1 | 8/2009 |

OTHER PUBLICATIONS

Yapta, Track flight prices and save money before and after you buy!, 1 page, www.yapta.com.

EasyPriceTracker, 8 pages, www.easypricetracker.com.

Canadian Intellectual Property Office, Requisition by Examiner, in Application No. 2,715547, dated Dec. 16, 2013. (3 pages).

Canadian Intellectual Property Office, Requisition by Examiner, in Application 2,715,547, dated Feb. 11, 2015 (3 pages).

Canadian Office Action dated Jun. 7, 2016 for Canadian Patent Application No. 2,715,547.

* cited by examiner

FIG. 2

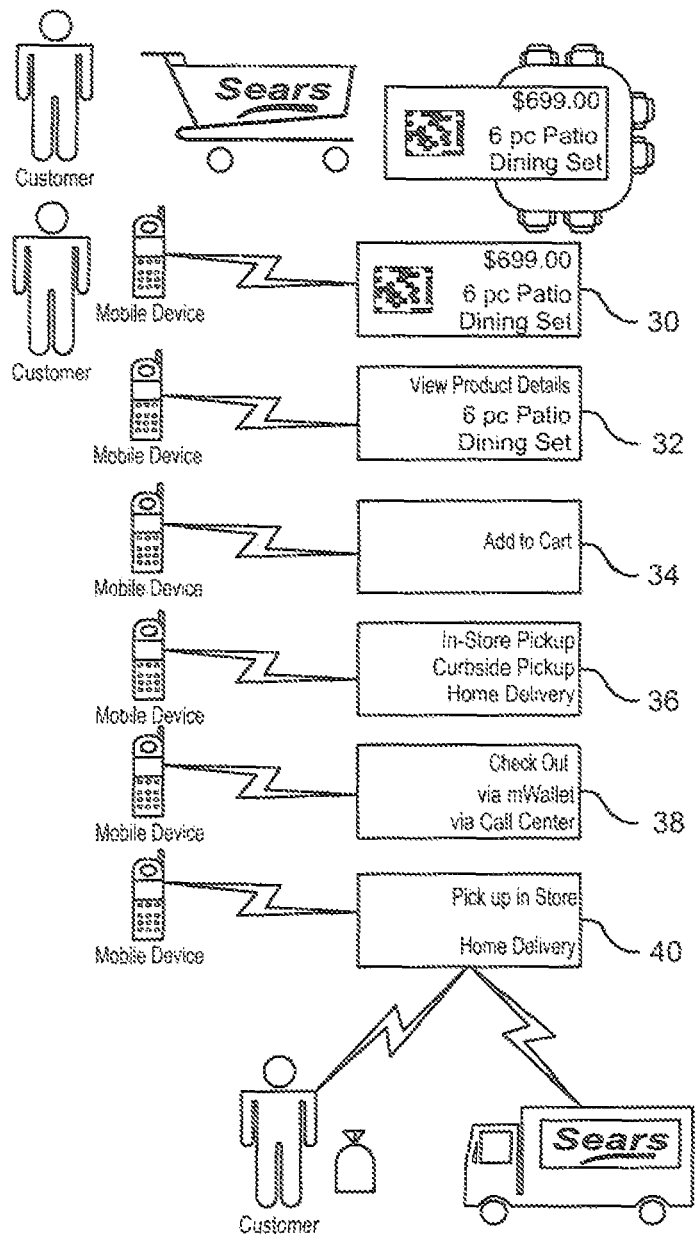

1.) Customer traverses store, finds item of interest.

2.) Customer scans the items display sign via Mobile Scanning Application (utilizing the mobile device's camera).

3.) Mobile device browser is redirected to product information page.

4.) Customer clicks "Add to Cart."

5.) Customer selects Pick-Up or Deliver Option.

6.) Customer clicks "Check Out" via mWallet or Call Center.

7.) Customer submits check-out via mobile device browser or with call center.

8.) An SMS receipt is sent to the customer

9.) Item(s) is/are Picked Up or Delivered.

SYSTEM AND METHOD FOR HANDLING AN OFFER TO PURCHASE A FOLLOWED ITEM

RELATED APPLICATION INFORMATION

This application claims the benefit of and is a continuation-in-part of U.S. application Ser. No. 12/850,722, filed on Aug. 5, 2010, which application is related to U.S. application Ser. No. 12/038,315, filed on Feb. 27, 2008, which application claims the benefit of U.S. Application No. 60/920,063, filed on Mar. 26, 2007, the disclosures of which are incorporated herein by reference in their entirety.

BACKGROUND

The descriptions that follow generally relate to retail services and, more particularly, describe a system and method for handling offers to purchase a followed item, such as an item designated using a mobile device price following application.

In the art systems and methods for using mobile devices in connection with retail services are known. For example, PCT Published Application No. WO 02/33518 generally describes a system in which a barcode representing a URL is imprinted on a page of printed material. A scanner (which can be a web enabled cellular telephone) is used to scan the barcode and translate the barcode into the URL address. A browser of the scanner uses the URL address to connect to a web page which contains further information related to the subject matter found on the printed material. The web page may also provide for the purchase of an item or service.

US Published Application No. 2005/0125301 generally describes a system that enables a user to instantly purchase items using a camera equipped mobile device, such as a cellular telephone. To purchase an item, a user utilizes the mobile device to scan a barcode for the item as it is displayed on a video screen. The barcode information and user information is then sent to a vendor server. The vendor server utilizes the user information to authenticate the user and to look up the user's payment and account information. This information is then passed to a transaction system by the vendor server in order to complete a transaction for the item.

JP Published Application No. 2002/170028 generally describes a system that allows a user to receive an electronic coupon on a mobile device, such as a cellular telephone, by accessing the Web using the mobile device.

PCT Published Application WO 01/97105 generally describes a system in which a mobile device with a bar code scanner, such as a cellular telephone, is used to scan a barcode associated with an advertisement to access a web page having item information and/or to purchase an item via the web.

U.S. Pat. No. 7,156,311 generally describes a cellular telephone application that decodes an image of a barcode, taken with a digital camera of the cellular telephone, to obtain barcode information that is, in turn, used to access web content that is associated with the barcode information.

U.S. Pat. No. 5,640,193 generally describes a system in which a device, equipped with a scanner, is used to read marks on an object, e.g., a barcode. The device then transmits a request to a server which includes data related to the read marks and the server responds by providing to the device multimedia information about the object.

U.S. Pat. No. 6,993,573 generally describes a system in which a cell phone is used to capture an image of a barcode and the cell phone uses the image to issue a URL request. The URL request is transmitted to a server and the server returns to the cell phone an information URL. The cell phone then transmits the information URL to an information server and in response receives content that is associated with the scanned barcode.

U.S. Pat. No. 6,199,048 generally describes a system in which a device reads a "data carrier modulated with an index" (e.g., a UPC label) and which uses the index to access a pointer to a remote computer. The pointer is then used to establish communication with the remote computer.

U.S. Pat. No. 5,978,773 generally describes a system in which a device reads an indicia provided on an ordinary article of commerce (e.g., a UPC label) and which uses the indicia to retrieve a network address that has been associated with the indicia.

U.S. Pat. Nos. 6,769,018 and 6,049,835 generally describe a system in which "jump codes" are published. A published "jump code" is entered at a first Internet location and the first Internet location converts the "jump code" to a URL address.

Various systems and methods for providing retail pickup services are also known in the art. For example U.S. Pat. No. 7,024,378 generally describes a method for providing vehicle pick-up service to a customer. The method involves a customer providing ID information to an "identification and control station" upon arriving at the pick-up facility/parking lot. The ID information may be read from a card, may be provided on a purchase receipt, etc. After the customer's ID information is provided, the customer is assigned a parking space and the goods ordered by the customer are delivered to that parking space.

U.S. Pat. No. 7,054,832 generally describes a method for providing vehicle pick-up service to a customer. The method involves a customer providing ID information to a "customer detection and identification station" upon arriving at the pick-up facility/parking lot. The ID information may be read from a card, a tag, etc. or may be keyed into "an input device." Upon providing the ID information, the customer may be assigned a parking space to which the goods ordered by the customer will be delivered. Alternatively, the customer can select a parking space and provide their ID information to the "customer detection and identification station" that is associated with the parking space selected by the customer.

PCT Published Application No. WO 2006/126996 generally describes a method for providing vehicle pick-up service to a customer. The customer is assigned a PIN and, once the customer arrives at the pick-up facility, the customer enters their PIN at a pick-up portal to receive the goods that were ordered/purchased by the customer.

Still further, various systems and methods are known for tracking the price of an item or service. For example, yapta.com provides an online website whereby a user can find a flight and thereafter track prices for the flight before electing to buy a ticket for the flight. To locate a flight for the purpose of tracking the price of flight tickets, the user enters into the yapta.com system flight information such as departing airport, arriving airport, departing time and date, and returning time and date. Similarly, websites such as easypricetracker.com allow a user to search for a particular item, for example by means of text entry, and to setup alerts whereby the easypricetracker.com system will email the user if the price drops.

SUMMARY

Described hereinafter is a system and method for facilitating a purchase of a followed item by a consumer. While not required, the consumer may utilize a mobile application to indicate a desire to follow the item and/or to make an offer to purchase the followed item. In certain circumstances, reward points earned by the consumer may be utilized to "buy down" or lower the price of a followed item to thereby cause the price of the followed item to meet a purchase price for that item as offered by the consumer.

A better understanding of the objects, advantages, features, properties and relationships of the system and method will be obtained from the following detailed description and accompanying drawing which sets forth illustrative embodiments which are indicative of the various ways in which the principles of the system and method may be employed.

BRIEF DESCRIPTION OF THE DRAWINGS

For a better understanding of the systems and methods described hereinafter reference may be had the following drawings in which:

FIGS. 2-3 illustrate an exemplary method for providing self service checkout and item delivery using a mobile device;

DETAILED DESCRIPTION

Referring now to Figures, a system and method for providing services that are tied to a mobile device, such as self service checkout and item delivery and price following are hereinafter described. As will become apparent, the system and method provides for a user to utilize a mobile device to obtain an item photograph and/or information from various forms of information carrying indicia, such as a barcode, to, among other things, purchase an item and/or service, specify purchase delivery options, and/or follow the price of an item. While the system and method will be particularly described in the context of a cellular telephone 10, it will be appreciated that the invention may be practiced using any type of mobile device having the ability to scan or photograph an image, the ability to perform network communications, and the ability to display data, such as Web/WAP pages, received via the network.

Figure 1:
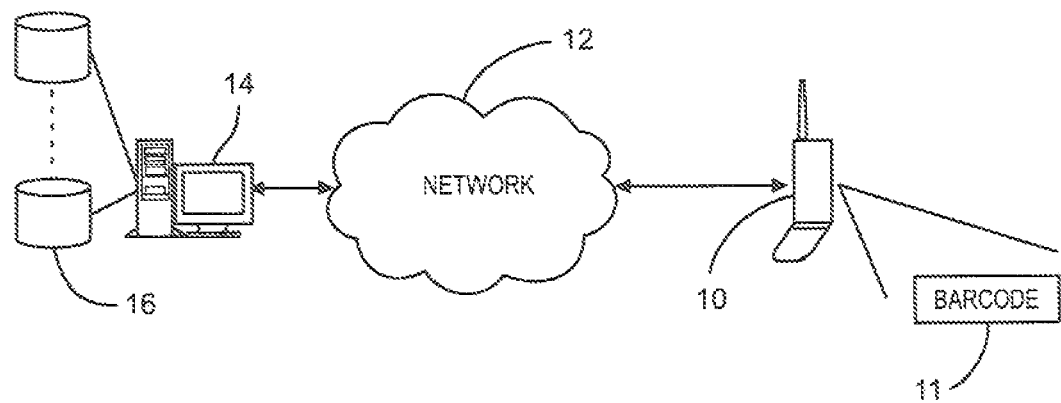
FIG. 1 illustrates an exemplary system in which the principles of the subject invention may be employed.

To facilitate use of the cellular telephone 10 within the system, generally illustrated in FIG. 1, the cellular telephone 10 includes a means to obtain information from the information carrying indicia 11. To this end, the cellular telephone 10 may include, for example, conventional barcode scanner technology or a camera and associated image processing technology as described in U.S. Pat. No. 7,156,311. Still further, the cellular telephone 10 may include convention RFID reading technology. Thus, it will be appreciated that the information carrying indicia 11 may include any form of machine-readable code having either a public standard encoding or a proprietary encoding and the cellular telephone 10 will use the technology that is appropriate to access the information carried by the particular form of information carrying indicia that is being employed within the system.

Figure 3:
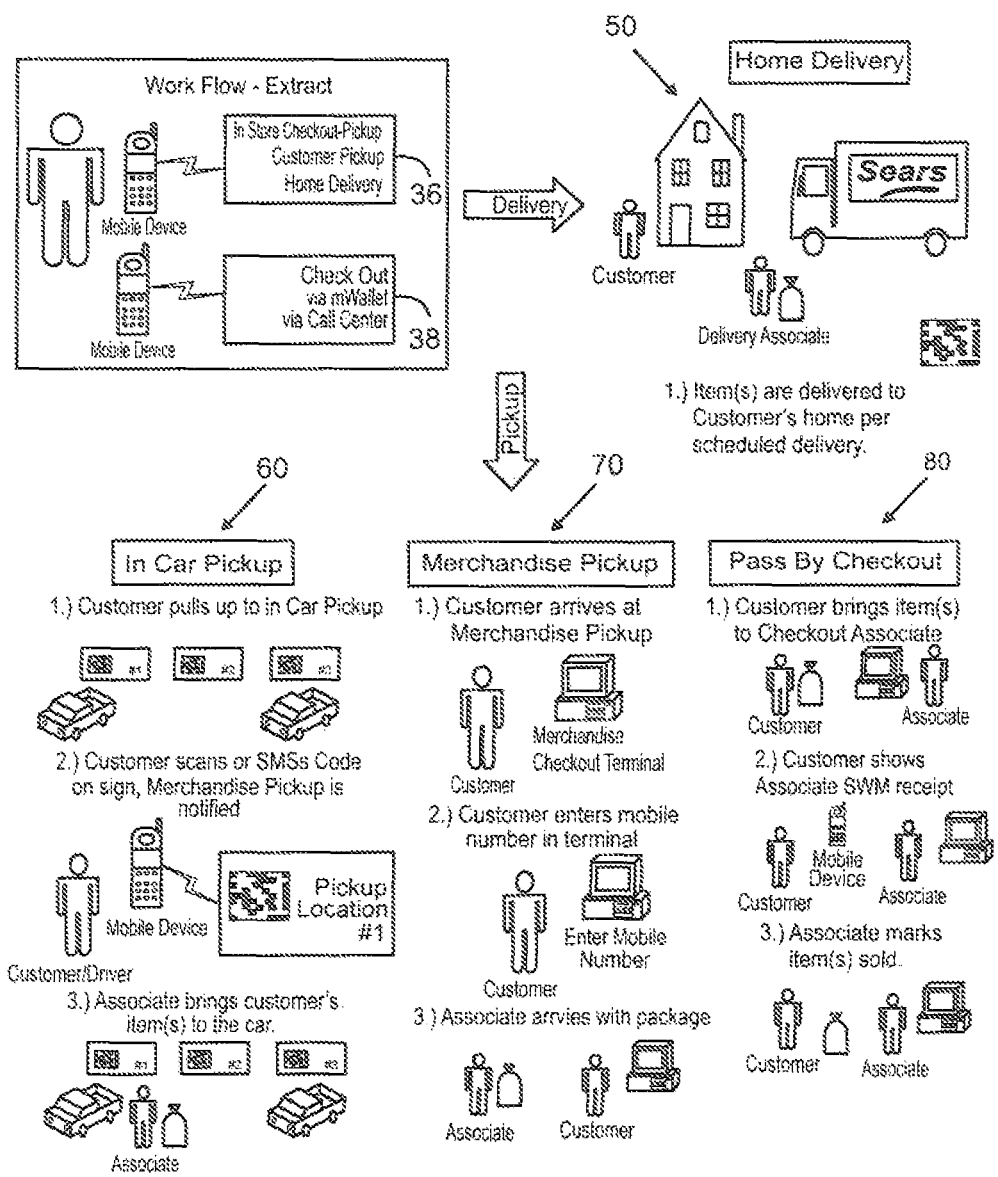

By way of particular example illustrated in FIGS. 2-3, to scan a barcode 11 a user may utilize a cellular telephone 10 having an attached or embedded digital camera. In this example, the user would launch an appropriate barcode imaging application that has been downloaded onto the cellular telephone 10 and use the digital camera to capture an image of the barcode 11. Once the barcode image 11 has been acquired by the cellular telephone 10, the barcode imaging application will function to decode the barcode to thereby extract information from the barcode. The information extracted from the decoded barcode may then be sent via a network 12 where it is routed to an appropriate server 14, having one or more associated data repositories 16, where it is further processed as discussed further below.

To provide for the downloading of a required imaging application into the cellular telephone 10 it is contemplated that a user may be presented with a display, for example within a retail establishment, on a Web/WAP (Wireless Access Point) page, in an SMS message, etc., which advertises the services provided by the subject invention. Within this advertising, the user could be further instructed to send a specified SMS message, for example "scan," to a specified SMS address. In response to the sending of such a message, the system may provide to the cellular telephone 10 a reply message which includes a WAP link which the user may activate, i.e., click on, to "opt-in" to the system and thereby install the imaging application upon their cellular phone 10. In connection with the installation of the imaging application upon the cellular phone 10 of the user, the system may additionally provide to the user instructions on use of the system, e.g., how to "scan" indicia that may be found on items such as price sheets, circulars, catalogs, display signs, monitors, price tags, etc. It will also be appreciated that, in certain circumstances, a required imaging application may be pre-installed on the cellular phone 10 of a user and pre-installed mobile devices may be on hand in retail outlets for the convenience of the users.

Once the cellular phone 10 of a user is setup as required to capture information from an information carrying indicia 11, the user may utilize the cellular phone to achieve various results upon encountering an information carrying indicia 11. For example, as illustrated in FIGS. 2-3, upon encountering an information carrying indicia 11 that is of interest to a user, for example a barcode that has been associated with an item at a retail establishment, the user may launch the imaging application on their cellular phone 10 and proceed to scan or capture the information carried by the information carrying indicia 11. Once the cellular phone 10 has captured the information from the information carrying indicia 11 that is of interest to the user, e.g., display 30, the system will function to use the information, for example as described in U.S. Pat. No. 7,156,311, to redirect a browser application of the cellular phone 10 to a desired Web/WAP page. In the illustrated example, the user may be first presented with a Web/WAP page 32 having information for the item that was associated with the information carrying indicia 11 that was scanned, e.g., an image of the item, availability of the item, price of the item, textual description of the item, etc. Furthermore, within the illustrated example, the Web/WAP page 30 presented to the user may be provided with further links to allow the user to send the Web/WAP page (or information related to the item) to another user, for example via email or SMS, to access price comparison information for the item and/or to request a price following for the item 402, to view further information for the item or other items such as upsell items related to the item, to add to a shopping list, to purchase the item, e.g., to "add to cart," etc.

In the event that user elects to purchase an item that is being viewed by the user on their cellular phone 10, for example, by the user activating the "add to cart" link 34, the system will respond by redirecting the browser application of the cellular device 10 to a further Web/WAP page which, in this example, presents to the user the contents of their shopping cart, i.e., a Web/WAP that informs the user as to the items that the user has indicated a desire to purchase. In connection with the item purchase process, the system may additionally present to the user a Web/WAP page 36 which allows the user to select a desired delivery option for the item, e.g., in store pick-up 60/70/80, home delivery 50, etc., as well as a Web/WAP page 38 which allows the user to select a desired payment option, e.g., to pay via a payment option already registered with the system (e.g., using a "M-Wallet" option), to pay via interactions with a customer service representative, etc. It will be appreciated that the Web/WAP pages 36 and 38 may be embodied on the same Web/WAP page without limitation. Once the item purchase process has been completed by the user, e.g., payment and the ability to deliver has been verified by the system using conventional methods, the system may then provide to the cellular phone 10 of the user an order confirmation (which may also indicate a time of availability for item pick-up if specified by the user as a delivery option) as well as an SMS receipt 40.

To then pick-up a purchased item if so specified by the user, the user may simply use the confirmation/receipt and/or their cell phone number in connection with a kiosk driven item pickup procedure 70 as described in, for example, U.S. Pat. No. 6,439,345. It will also be appreciated that, by providing a confirmation/receipt to the cellular phone 10 of the user, the user may be provided with an option to obtain item off the shelf 80 whereupon the user may then simply show the confirmation/receipt with the item(s) purchased to a sales associate to thereby exit the retail establishment.

In the event a user elected to pickup a purchased item using an in-car pickup process 60, the user may further use their cellular phone 10 to inform the system when they are ready for delivery of the item(s) purchased. For example, when the user arrives at the pick-up facility, the user may scan a barcode that has been affixed to a parking spot, SMS a message as directed by a sign associated with a parking spot, etc. to thereby notify the system that they are ready for item pick-up. Generally, the information provided to the system will include the parking spot in which the user is located as well as information by which the prior purchase history of the user may be accessed, e.g., the cell-phone number of the user. The system will then use the information that is provided from the cellular telephone 10 to thereby deliver to the vehicle of the user the appropriate purchased items.

As will be appreciated, via use of the described scanning application in any location, such as a home, a store of a third party retailer, etc, a user may be presented with a web page that provides to the user the host retailer's information for that item or an item determined by the host retailer to be similar thereto (both individually and collectively referred to herein as the item) such that, from any location, the user may purchase the item from the host retailer, schedule the purchased item for delivery from or pickup at a location of the host retailer, etc.

Figure 4:
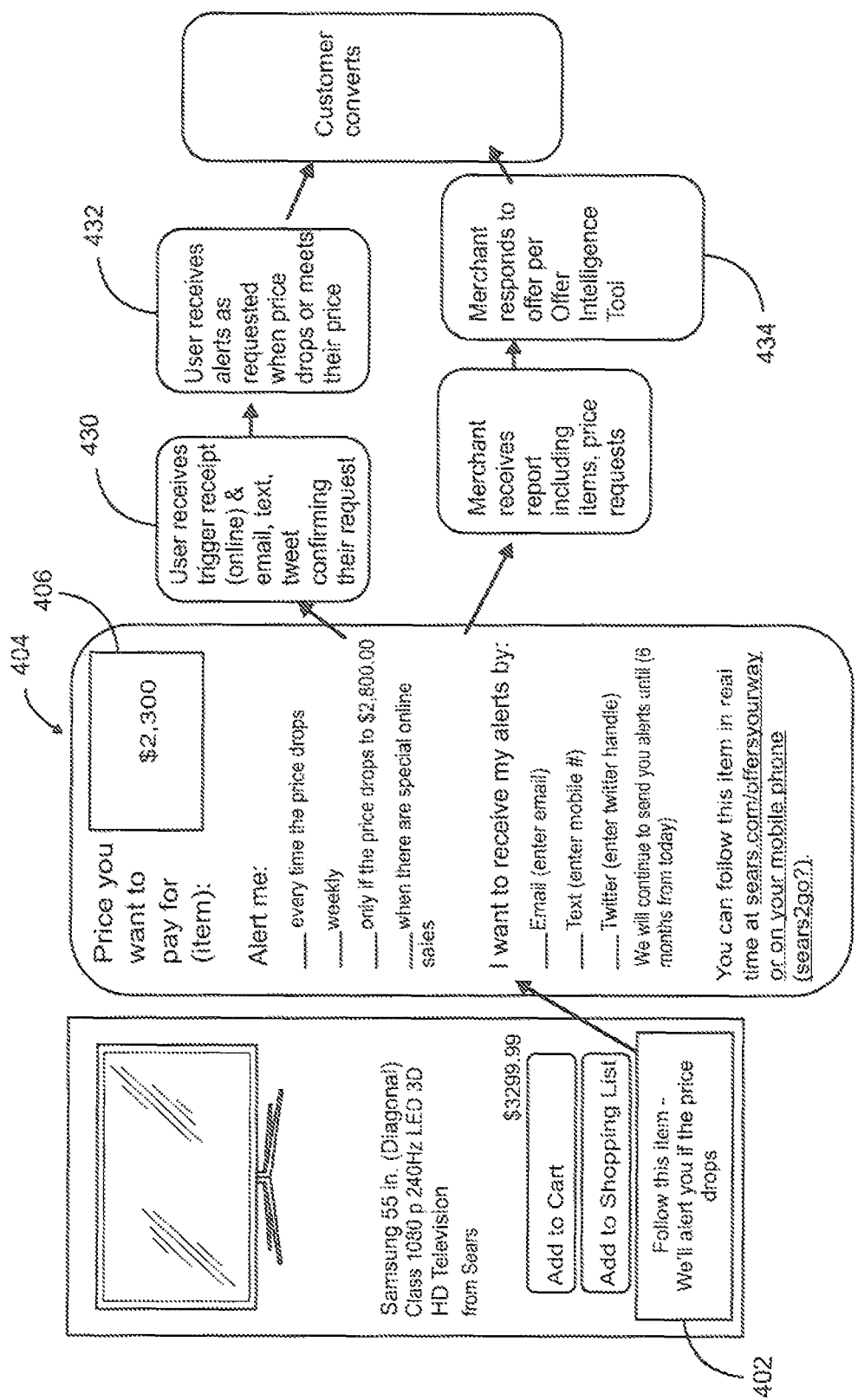
FIGS. 4 and 5 illustrates an exemplary method for providing a price following service to a user of a mobile device.

In the event that user elects to following a price for the item, for example by the user clicking on a displayed "follow this item" icon 402, the system will respond by redirecting the browser application of the cellular device 10 to a further Web/WAP page 404, such as illustrated in FIG. 4, by which, in this example, the user is provided a means to setup one or more parameters for following the price of the item corresponding to the indicia read or photograph taken through use of the cellular device 10. By way of example only, the user can optionally specify 406 a price that the user would like to pay for the item and can request that price alerts related to the price of the item be sent according to one or more of: every time the price drops, weekly; only if the price falls below the price specified by the user (as set above); when there are special sales for the item (whether online or at a store); and the like. etc. In connection with the establishment of these price alert notification parameters, the user may also inform the system of one or more addresses to which such price alert notifications are to be sent to the customer, for example, via an email message (with the user providing an email address if necessary), via a text message (with the user providing a mobile number if necessary), via a social networking message (with the user providing a social networking username if necessary), etc. Once established, the price notification service can be set to execute for a predetermined period of time (such as six months), for a user specified period of time, until such time as the system detects that the user purchases the item, and/or for as long as the user does not request a cancellation of the notification service. In addition, once the price notification service has been established through use of the mobile device 10, the information pertaining thereto may be provided to a centralized system whereby the user can modify the established notification parameters, follow the price of the item in real time, purchase the item, etc. by means of the mobile application, a ".com website" that is associated with the host retailer and the like. It is to be appreciated that the user need not provide any payment related information to follow an item according to the description set forth herein.

Figure 6:
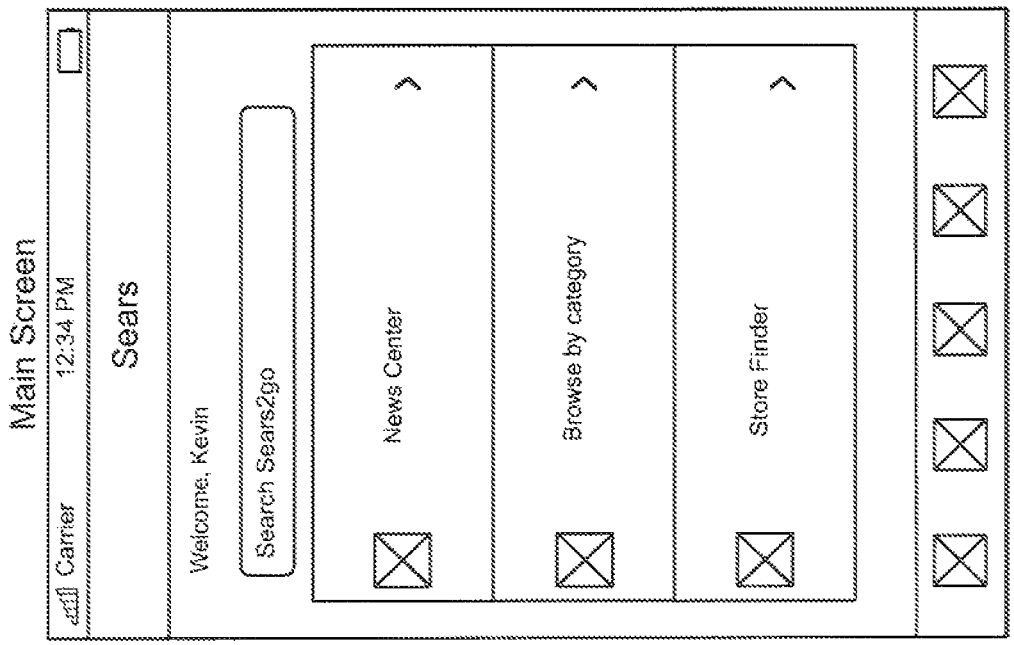
FIGS. 6 and 7 illustrate exemplary screen shots of mobile application for providing price following information to the user of the mobile device.
Figure 7:
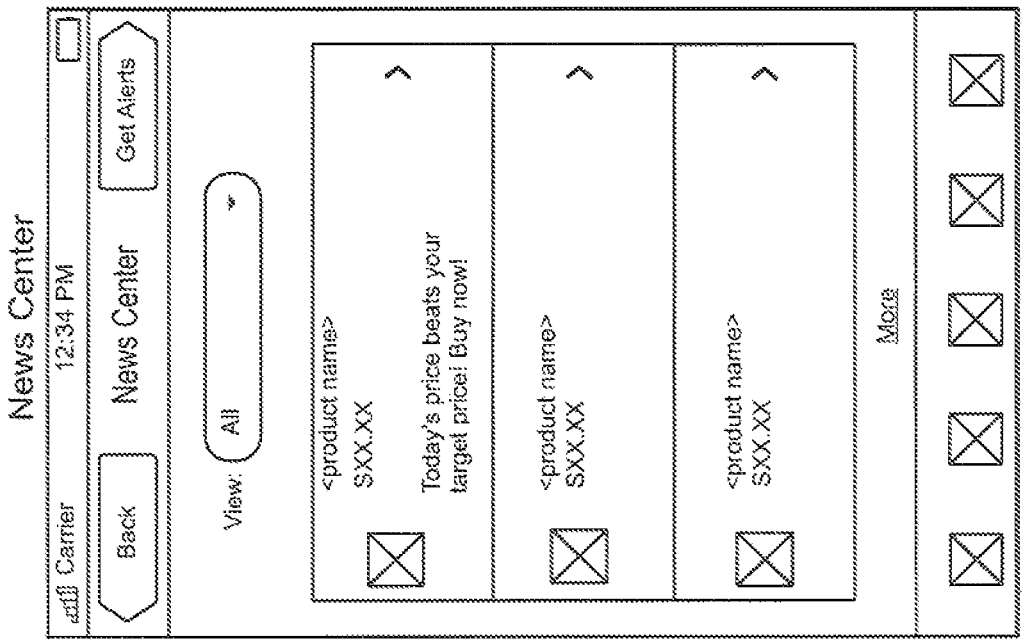

After the user completes and submits the price notification parameter setup page 404 to the system of the host retailer 421, the user may receive a confirmation 430 that the price notification has been setup with the host retailer system and the host retailer system will proceed to issue notifications according the established notification parameters 432. During the period of time that the item notification event is active the host retailer system may also function to provide to the user, via one or more of the established notification channels, additional information concerning the item, such as posted reviews (by "social network" friends of the user and/or others), news related to the item, etc. By way of example only, FIGS. 6 and 7 illustrate a mobile application having a site section by which a customer can access price alerts for one or more items as establish by the customer as well as any other related content alerts that may be provided by the system. As desired, the host retailer system may also be setup to respond 434 to the price established by the customer during the notification setup process as further illustrated in FIG. 5.

Figure 5:
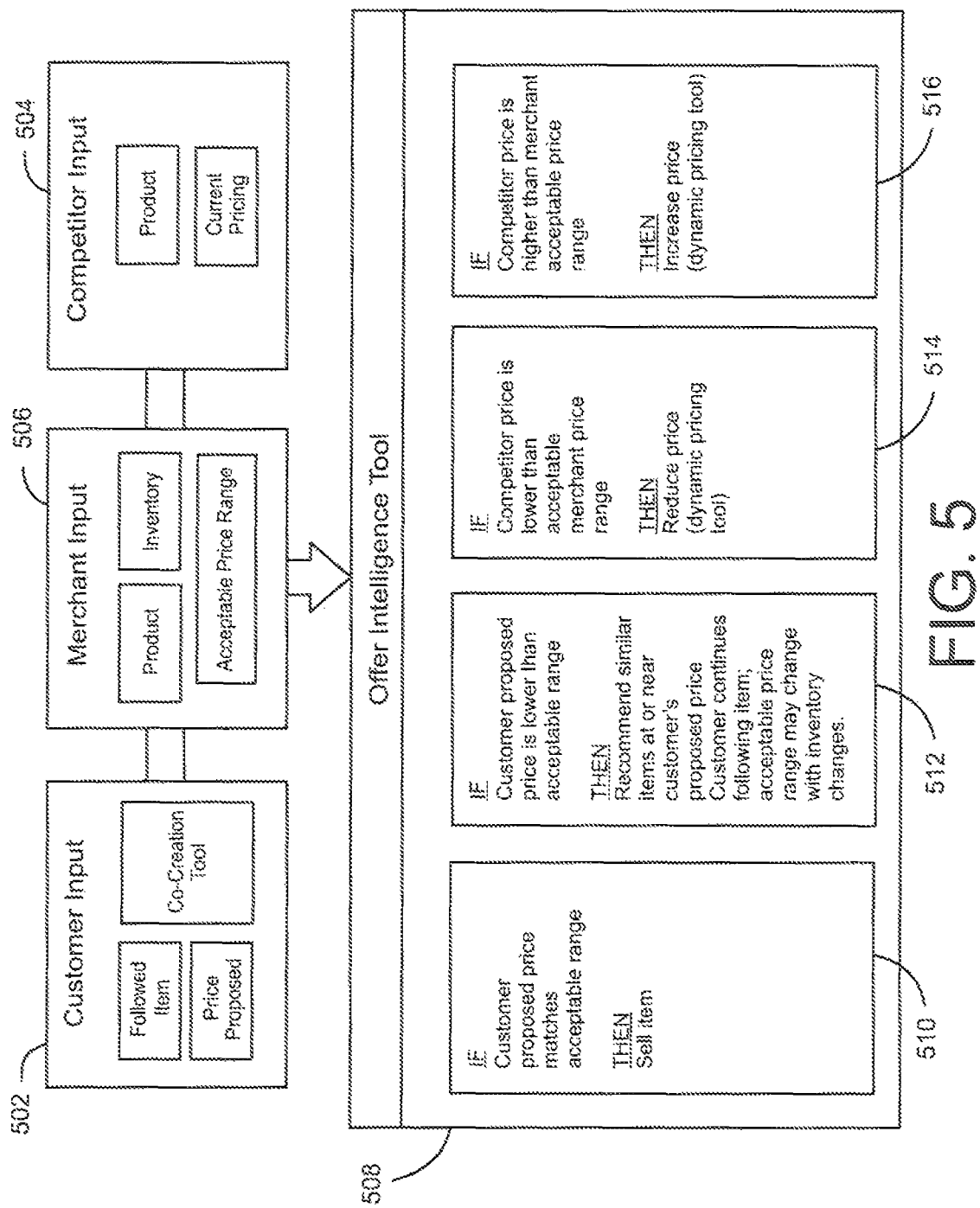

Turning to FIG. 5 and as noted above, the host retailer system will receive from the customer 502 input pertaining to an item to be followed which may further include an offer price that the customer would like to pay for the item. Input to the host retailer system may additionally include competitor input 504 for the item, such as current competitor pricing for the same or similar items, which competitor input may be provided to the system by the merchant, may be scraped from a competitor website, etc., as well as merchant input 506 for that item, such as item inventory level and an acceptable price range for the item. With this input, an offer intelligence tool 508 implemented by the host retailer system may proceed to make various determinations related to the customer's price tracking of and general interest in the item. By way of example only and without limitation, the offer intelligence tool 508 may perform various comparisons using the received inputs to perform one or more of the following:

1) determine 510 if the desired price for the item included in the customer input 502 is within or above the acceptable price range as included in the merchant input 506 and, if so, cause the system to take the steps necessary to proceed with a sale of the item to the customer at the desired price indicated in the customer input 502;

2) determine 512 if the desired price for the item included in the customer input 502 is lower than the acceptable price range as included in the merchant input 506 and, if so, cause the system to recommend to the customer (using an email communication of the like) other, similar items that are being offered for sale by the merchant at or near the customer's desired price;

3) determine 514 if the competitor's price for item as included in the competitor input 504 is lower than the acceptable price range as included in the merchant input 506 and, if so, cause the merchant's acceptable price range for the item to be downwardly adjusted whereupon the comparisons herein described may be repeated as necessary; and 4) determine 516 if the competitor's price for the item included as included in the competitor input 504 is higher than the acceptable price range as included in the merchant input 506 and, if so, cause the merchant's acceptable price range for the item to be upwardly adjusted whereupon the comparisons herein described may be repeated as necessary. In the case of 2) above, in the event that the customer does not proceed to purchase a similar item that was recommended to the customer, the price notifications will continue to be sent to the customer in the manner that was specified.

In certain embodiments, it is also contemplated that the retailer may offer a rewards program whereby a registered customer, i.e., a customer having an assigned member number or other associated identifier, earns rewards points for purchasing items in a store and/or online, e.g., 10 points for every $1.00 spent on qualifying purchases which, in some cases, may be subject to one or more bonus multipliers based upon a membership level of the customer in the program. Thus, when a price offered by a customer for a followed item is below what is acceptable to the retailer, an option may be provided for a registered customer to use previously earned rewards points to "buy down" the retailer's acceptable price to the customer's offered price. By way of example only, in the event that a customer's offered price for a followed item (e.g., $X) is determined by the retailer system to be below a price that would be acceptable to the retailer for that item (e.g., $Y>$X—determined using one or more of the steps above noted), the system may determine an acceptable amount of redemption points (e.g., Z rewards points) that could be redeemed by the customer to lower the price of the followed item to the price that was offered by the customer (e.g., $X) and, if customer has the required number of rewards points accumulated in their account, the system could inform the customer of their current rewards points balance and offer the customer the followed item at the customer specified price (e.g., $X) if the customer is willing to redeem the determined, acceptable amount of rewards points. To this end, the system may provide a notification such as "You have a balance of XX,XXX rewards points. You can purchase the [item] for your offer of [$X] if you are willing to redeem [Z] rewards points." A link may also be provided with the notification to facilitate the placing of the item, at the customer's offered price with the required rewards points redemption amount, in the shopping cart for checkout by the customer as described above. In the event that the customer does not have the required number of rewards points accumulated in their account, the system may notify the customer that their current offer is being rejected but inform the customer that, if they purchase the item at the retailer's suggested price (e.g., $Y), they can earn a given number of rewards points (e.g., A rewards points) which they could redeem in the future for merchandise discounts. In this case, the rewards points (e.g., A rewards points) could be determined using the established criteria for all rewards points for that customer or using an criteria particularly established for the offer/counter-offer form of purchasing a followed item.

While specific embodiments of the invention have been described in detail, it will be appreciated by those skilled in the art that various modifications and alternatives to those details could be developed in light of the overall teachings of the disclosure. For example, it will be appreciated that the subject system may be used in connection with a registry application, such as bridal or baby registry, where a user would populate the registry using the mobile phone scanning device and the registry would be available on-line or in-store to facilitate purchasing of items. Similarly, the functionality described herein may be provided, in part, via use of an app provided to a smart phone device. Yet further, while described in the context of a mobile phone being used by a consumer to establish a request to follow an item, etc., it is to be understood that the consumer may also utilize other computing devices to this same end. Accordingly, the particular arrangements disclosed are meant to be illustrative only and not limiting as to the scope of the invention which is to be given the full breadth of the appended claims and any equivalents thereof.

All references discussed within this application are hereby incorporated by reference in their entirety.

What is claimed is:

1. A non-transitory machine-readable storage device, having stored thereon a computer program having at least one code section for facilitating a purchase of an item, the at least one code section executable by a machine for causing the machine to perform a method comprising:

causing a camera or a scanner of a mobile device of a customer to take a photo of or scan a bar code or coded image associated with an item;

extracting information from the bar code or coded image associated with the item;

causing a graphical user interface of the mobile device, based on the extracted information, to initiate a price following process including requesting to designate the item for price following;

receiving an indication via the graphical user interface of the mobile device that the customer has initiated a price following process;

receiving, via the graphical user interface of the mobile device of the customer, a request to designate an item for price following for the customer after the mobile device takes a photo of or scans a bar code or coded image associated with the item, wherein one or both of the mobile device and the machine are configured to track the price of the item before the item is purchased by the customer;

causing, via the graphical user interface of the mobile device, a browser application of the mobile device to be redirected to one or more web pages based on information extracted from the photo or the scan, wherein the one or more web pages have information about the item, wherein, via the one or more web pages, the customer sets up the price following by setting one or more of the following: one or more price parameters, a time period over which the price following is active, and one or more price notification alerts based on the one or more price parameters;

causing an SMS message to be sent to another customer, with a link to the one or more web pages based on information extracted from the photo or the scan in response to actions taken by the customer via the one or more web pages to enable the another customer to request a price following of the item;

tracking the price of the item before the item is purchased by the customer;

causing news and social network reviews related to the item to be sent to mobile device;

reducing the price of the item and downwardly adjusting an acceptable price range when competitor pricing information is lower than the acceptable price range, wherein the acceptable price range is a range of prices for which the item can be sold without using rewards points;

increasing the price of the item and upwardly adjusting the acceptable price range when the competitor pricing information is higher than the acceptable price range;

receiving, via the mobile device of the customer having an associated rewards points account, a price offer for the item that was previously designated for price following;

determining if that the price offer for the item is below an established threshold price, wherein the established threshold price is a lowest price that the item can be sold without using reward points;

when the price offer for the item is below the established threshold price, determining an amount of rewards points to be redeemed by the customer to thereby allow the customer to purchase the item at the price offer for the item as received from the customer; and allowing the item to be purchased by the customer at the price offer for the item as received from the customer in the event that the customer indicates a willingness to redeem by supplementing the price offer by redeeming the determined amount of rewards points from the rewards points account of the customer.

2. The non-transitory machine-readable storage device as recited in claim 1, comprising: determining that the customer fails to have the determined amount of rewards points in the associated rewards point account; and inhibiting wherein the instructions inhibit the purchasing of the item at the price offer for the item as received from the customer because the customer does not have enough rewards points when it is determined that the customer fails to have the determined amount of rewards points in the associated rewards point account.

3. The non-transitory machine-readable storage device as recited in claim 1, wherein the instructions cause reward points to be added to a rewards point account in response to a qualifying item being purchased.

4. The non-transitory machine-readable storage device as recited in claim 3, wherein the amount of rewards points to be added to the rewards points account is a percentage of a dollar amount spent.

5. The non-transitory machine-readable storage device as recited in claim 4, wherein a bonus multiplier is provided to the amount of rewards points to be added to the rewards points account as a function of a membership level of the customer.

6. The non-transitory machine-readable storage device as recited in claim 1, wherein the item is an item having a price, and the at least one code section comprises code executable by the machine for causing the machine to allow the customer to follow the price of the item.

7. The non-transitory machine-readable storage device as recited in claim 6, wherein the instructions cause one or more alerts having information related to the price of the item to be sent to the customer, wherein the alert indicates that when the price of the item drops has fallen in the physical store.

8. The non-transitory machine-readable storage device as recited in claim 1, wherein the request to designate the item for price following includes one or more parameters set up by the customer, wherein the one or more parameters indicate conditions for alerting the customer with respect to the item being price followed.

9. The non-transitory machine-readable storage device as recited in claim 1, wherein the mobile device images the item using a particular imaging application installed on the mobile device, wherein transmitting a particular SMS message from the mobile device facilitated an installation of the particular imaging application on the mobile device.

10. The non-transitory machine-readable storage device as recited in claim 1, wherein the mobile device images the item using a particular imaging application downloaded on the mobile device while at the physical store.

11. The non-transitory machine-readable storage device as recited in claim 1, wherein the mobile device images the item using a particular imaging application installed on the mobile device, wherein the particular imaging application is downloaded from a wireless access point located at the physical store.

12. The non-transitory machine-readable storage device as recited in claim 8, wherein the one or more parameters comprises one or more of an address, an email address, a phone number, and a social networking username to which the one or more alerts are to be sent.

13. The non-transitory machine-readable storage device as recited in claim 1, wherein the request to designate the item for price following includes price following of the item in the physical store and online.

14. The non-transitory machine-readable storage device as recited in claim 1, wherein the request to designate the item for price following includes conditions for price-following termination including time period expiration and item purchase, or wherein the price following of the item is real-time price following of the item.

15. The non-transitory machine-readable storage device as recited in claim 1, comprising:
  selling the item if the price offer falls within an acceptable range; and
  recommending other items if the price offer falls below the acceptable range.

16. The non-transitory machine-readable storage device as recited in claim 1, comprising providing the customer with price information and other non-price information about the item being actively price followed while the price following is active for the item.

17. The non-transitory machine-readable storage device as recited in claim 1, wherein the established threshold price is established based on item inventory and competitor pricing information for the item or a similar item.

18. The non-transitory machine-readable storage device as recited in claim 1, wherein, when the price offer for the item is below the established threshold price, comprising:

offering for sale to the customer similar items near the price offer based on the price offer for the item being below the established threshold price.

19. The non-transitory machine-readable storage device as recited in claim 1, wherein the established threshold price is lowered based on competitor pricing of the item, and comprising causing the mobile device to receive pricing for same item and similar items from multiple merchants.

20. The non-transitory machine-readable storage device as recited in claim 1, comprising populating a gift registry by taking the photo of or scanning the bar code or coded image associated with the item while the customer is in the physical store.

\* \* \* \* \*